United States Patent
Ono et al.

(10) Patent No.: US 10,027,259 B2
(45) Date of Patent: Jul. 17, 2018

(54) BRAKING APPARATUS HAVING FUNCTION OF DETECTING BRAKE ACTUATION AND RELEASE FAULTS

(71) Applicant: FANUC CORPORATION, Minamitsuru-gun, Yamanashi (JP)

(72) Inventors: Katsuya Ono, Yamanashi (JP); Takeshi Tamaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/217,089

(22) Filed: Jul. 22, 2016

(65) Prior Publication Data

US 2017/0033714 A1    Feb. 2, 2017

(30) Foreign Application Priority Data

Jul. 31, 2015 (JP) ................................. 2015-152767

(51) Int. Cl.
| | |
|---|---|
| H02K 7/10 | (2006.01) |
| H02P 3/08 | (2006.01) |
| F16D 1/00 | (2006.01) |
| H02P 3/04 | (2006.01) |
| H02K 7/102 | (2006.01) |
| H02K 11/20 | (2016.01) |

(52) U.S. Cl.
CPC .............. *H02P 3/08* (2013.01); *F16D 1/00* (2013.01); *H02K 7/1025* (2013.01); *H02K 11/20* (2016.01); *H02P 3/04* (2013.01); *H02K 2213/06* (2013.01)

(58) Field of Classification Search
USPC ........................................ 318/362, 372, 383
See application file for complete search history.

(56) References Cited

U.S. PATENT DOCUMENTS

| | | | |
|---|---|---|---|
| 2012/0313561 A1 | 12/2012 | Okamoto | |
| 2013/0069567 A1* | 3/2013 | Hild | H02P 3/04 318/362 |
| 2014/0313621 A1* | 10/2014 | Innes | H02P 3/12 361/24 |

FOREIGN PATENT DOCUMENTS

| | | |
|---|---|---|
| JP | H08182365 A | 7/1996 |
| JP | 2008220047 A | 9/2008 |
| JP | 2011176935 A | 9/2011 |
| JP | A 2014-010546 | 1/2014 |
| JP | A 2014-050912 | 3/2014 |

OTHER PUBLICATIONS

Notification of Reasons for Refusal for Japanese Application No. 2015-152767, dated Jul. 24, 2017, including English translation, 6 pages.

* cited by examiner

*Primary Examiner* — Jorge L Carrasquillo
(74) *Attorney, Agent, or Firm* — RatnerPrestia (57) ABSTRACT

A braking apparatus according to one embodiment of the present invention is a braking apparatus for use in an electrical motor, and comprises a braking unit which locks the electrical motor in position, a voltage detection unit which detects a voltage applied to the braking unit, and an observing unit which recognizes a voltage variation pattern and, based on the voltage variation pattern, observes the released and actuated states of the braking unit.

3 Claims, 6 Drawing Sheets

| | BRAKE COMMAND | | FAULT SITE | EVALUATION |
|---|---|---|---|---|
| | BRAKE RELEASED STATE (BRAKE IS RELEASED) 24[V] on | BRAKE ACTUATED STATE (BRAKE IS LOCKED) 24[V] off | | |
| (1) | 0[V] → +24[V]<br>0 → + | +24[V] → -95[V]<br>+ → - | — | NORMAL |
| (2) | 0[V] → +24[V]<br>0 → + | +24[V] → 0[V]<br>+ → 0 | BETWEEN VOLTAGE MEASURING POINT AND BRAKE | BROKEN WIRE |
| (3) | 0[V] → +24[V]<br>0 → + | 0[V] → 0[V]<br>0 → 0 | BETWEEN VOLTAGE MEASURING POINT AND POWER SUPPLY | BROKEN WIRE |
| (4) | 0[V] → 0[V]<br>0 → 0 | 0[V] → 0[V]<br>0 → 0 | BETWEEN VOLTAGE MEASURING POINT AND POWER SUPPLY | BROKEN WIRE |
| (5) | 0[V] → +24[V]<br>0 → + | +24[V] → +24[V]<br>+ → + | RELAY | FUSED |
| (6) | +24[V] → +24[V]<br>+ → + | +24[V] → +24[V]<br>+ → + | RELAY | FUSED |
| VOLTAGE VARIATION PATTERNS | | | | |

| | | BRAKE COMMAND | | FAULT SITE | EVALUATION |
|---|---|---|---|---|---|
| | | BRAKE RELEASED STATE (BRAKE IS RELEASED) 24[V] on | BRAKE ACTUATED STATE (BRAKE IS LOCKED) 24[V] off | | |
| (1) | | 0[V] → +24[V] | +24[V] → -95[V] | — | NORMAL |
| | | 0 → A | A → B | | |
| (2) | | 0[V] → +24[V] | +24[V] → 0[V] | BETWEEN VOLTAGE MEASURING POINT AND BRAKE | BROKEN WIRE |
| | | 0 → A | A → 0 | | |
| (3) | | 0[V] → +24[V] | 0[V] → 0[V] | BETWEEN VOLTAGE MEASURING POINT AND POWER SUPPLY | BROKEN WIRE |
| | | 0 → A | 0 → 0 | | |
| (4) | | 0[V] → 0[V] | 0[V] → 0[V] | BETWEEN VOLTAGE MEASURING POINT AND POWER SUPPLY | BROKEN WIRE |
| | | 0 → 0 | 0 → 0 | | |
| (5) | | 0[V] → +24[V] | +24[V] → +24[V] | RELAY | FUSED |
| | | 0 → A | A → A | | |
| (6) | | +24[V] → +24[V] | +24[V] → +24[V] | RELAY | FUSED |
| | | A → A | A → A | | |

VOLTAGE VARIATION PATTERNS

BRAKING APPARATUS HAVING FUNCTION OF DETECTING BRAKE ACTUATION AND RELEASE FAULTS

BACKGROUND OF THE INVENTION

1. Field of the Invention

The present invention relates to a braking apparatus, and more particularly to a braking apparatus having a function of detecting brake actuation and release faults.

2. Description of the Related Art

A motor braking apparatus releases braking by applying a voltage. However, due to a fault such as a cable or brake coil break or a relay breakage, it may not be possible to release the brake even when a voltage is applied. On the other hand, if relay contacts are fused, the brake may remain released, which can lead to a situation in which an axis driven by the motor drops thus causing damage to a tool or a workpiece. To address this, brake fault detection methods have been developed (for example, refer to Japanese Unexamined Patent Publication Nos. 2014-50912 and 2014-10546, hereinafter referred to as "Patent Document 1" and "Patent Document 2", respectively).

A brake drive control apparatus disclosed in Patent Document 1 comprises a voltage detection unit which detects a braking voltage applied to a brake, a switch command delaying unit which delays a switch command, and a short-circuit fault determining unit which, based on the delayed switch command, determines whether a short-circuit fault has occurred to a switching device.

A brake fault diagnostic apparatus disclosed in Patent Document 2 comprises a fault diagnostic unit which performs diagnosis to determine whether there is a brake fault or not when a motor is energized and the brake is in an actuated state, and an output unit which, when a brake fault is detected, outputs a brake fault signal without deenergizing the motor and without releasing the brake.

Figure 1:
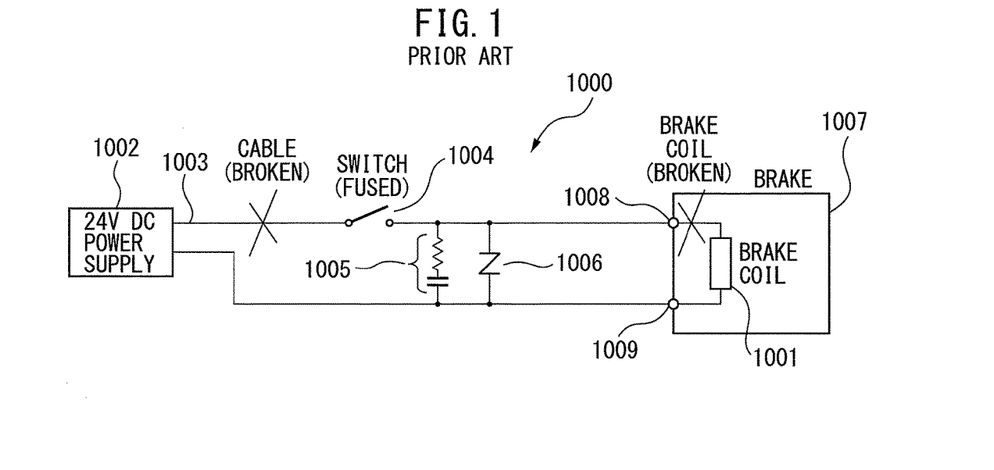
FIG. 1 is a diagram showing the configuration of a conventional art braking apparatus.

FIG. 1 is a diagram showing the configuration of a conventional art braking apparatus 1000. A voltage (for example, 24 [V]) supplied from a DC power supply 1002 is applied via a cable 1003, a switch 1004, a spark killer 1005, and a surge absorber 1006 to the terminals 1008 and 1009 of a brake 1007. The brake 1007 is provided with a brake coil 1001.

Figure 2:
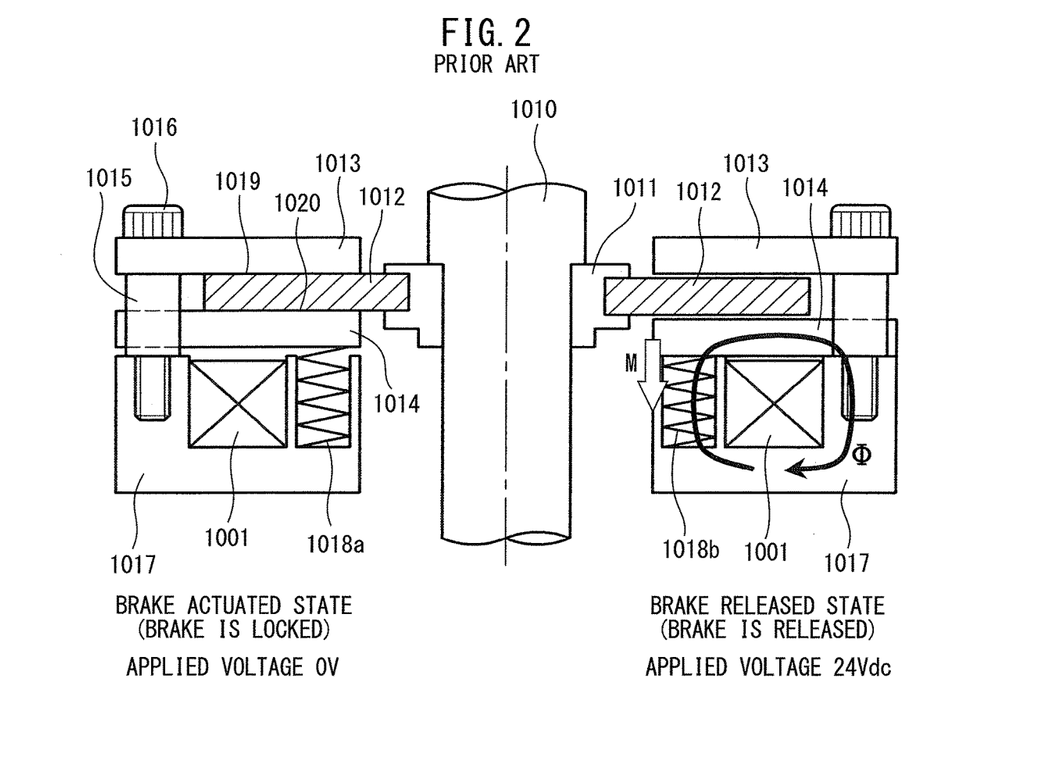
FIG. 2 is a cross-sectional view of a conventional art brake.

The structure of a brake used in a motor (hereinafter also called an "electrical motor") will be described. FIG. 2 shows a cross-sectional view of a conventional art brake. A friction plate 1012 is attached to a motor shaft 1010 via a hub 1011. An end plate 1013 is provided on one face of the friction plate 1012, and an armature 1014 is provided on the other face. The end plate 1013 is fixed to a core 1017 with a bolt 1016 by interposing a spacer 1015 therebetween. The armature 1014 is mounted so as to be slidable along the longitudinal direction of the bolt 1016.

The core 1017 is provided with a brake coil 1001. When the voltage applied to the brake coil 1001 is 0 [V], the armature 1014 is pressed against the friction plate 1012 by a spring 1018a, as shown in the left part of FIG. 2. As a result, a first friction part 1019 is formed between the friction plate 1012 and the end plate 1013 and a second friction part 1020 is formed between the friction plate 1012 and the armature 1014. With this friction, the brake is actuated, and the motor is locked in a given position, thus putting the brake in a locked state.

On the other hand, when the voltage applied to the brake coil 1001 is a brake releasing voltage (for example, 24 [V]), a magnetic attraction force M greater than the pressing force of the spring 1018b is exerted due to a magnetic flux $\Phi$, and the spring 1018b is compressed, thus disengaging the armature 1014 from the friction plate 1012. As a result, the first friction part 1019 formed between the friction plate 1012 and the end plate 1013 and the second friction part 1020 formed between the friction plate 1012 and the armature 1014 no longer exist. Consequently, the brake is released, thus putting the brake in a released state.

A possible cause for a fault that can occur in the braking apparatus may be a break in the brake coil 1001. Other possible causes include a break in the cable 1003 and a fusing of the switch 1004.

However, in the conventional art braking apparatus, it has not been easy to check the actual released state of the brake and to identify a cause for a brake release fault. More specifically, it has not been possible to check whether the brake has actually been released when a voltage is applied to the brake. As a result, if the motor is driven when the brake is not actually released, the brake may be dragged, resulting in damage to the brake friction parts or causing damage (such as an insulation failure or winding resistance failure) to the motor due to the frictional heat of the brake. On the other hand, when the voltage to the brake is turned off in order to apply the brake, if the brake remains released, the axis driven by the motor may drop thus causing damage to a tool or a workpiece.

SUMMARY OF THE INVENTION

It is an object of the present invention to provide a braking apparatus capable of detecting the fault that the brake will not be released even when a voltage is applied to the braking apparatus and the fault that the brake remains released even when the voltage to the brake is turned off. It is another object of the present invention to provide a braking apparatus capable of localizing a fault site causing the brake actuation or release fault.

A braking apparatus according to one embodiment of the present invention is a braking apparatus for use in an electrical motor, and comprises a braking unit for keeping position of the electrical motor, a voltage detection unit for detecting a voltage applied to the braking unit, and an observing unit for recognizing a voltage variation pattern and, based on the voltage variation pattern, observing the released and actuated states of the braking unit.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILS DESCRIPTION

Braking apparatus according to the present invention will be described below with reference to drawings.

First Embodiment

Figure 3:
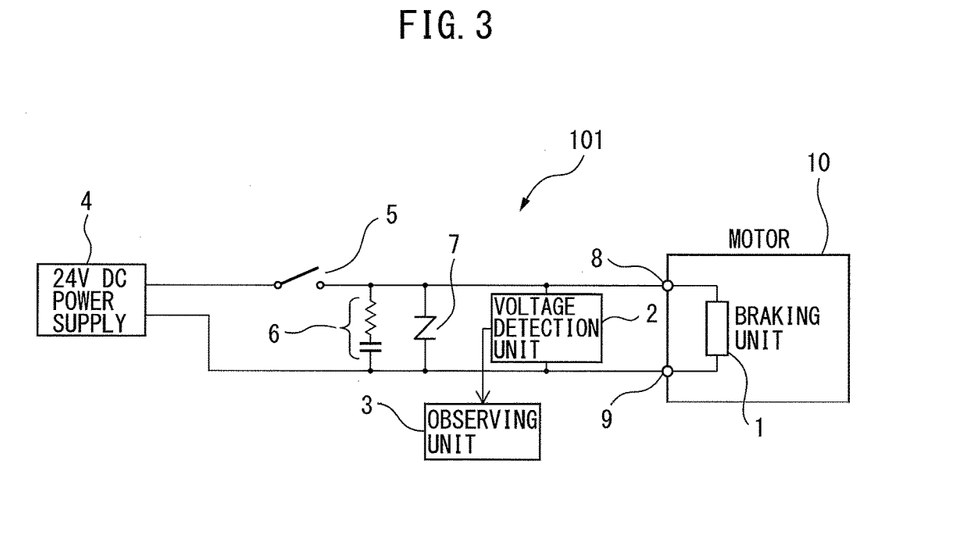
FIG. 3 is a diagram showing the configuration of a braking apparatus according to a first embodiment of the present invention.

First, a braking apparatus according to a first embodiment of the present invention will be described with reference to drawings. FIG. 3 is a diagram showing the configuration of the braking apparatus according to the first embodiment of the present invention. The braking apparatus 101 according to the first embodiment of the present invention is a braking apparatus for use in an electrical motor, and comprises a braking unit 1 for keeping position of the electrical motor (motor) 10, a voltage detection unit 2 for detecting a voltage applied to the braking unit 1, and an observing unit 3 for recognizing a voltage variation pattern and, based on the voltage variation pattern, observing the released and actuated states of the braking unit 1.

The braking unit 1 is built into the motor 10, and the release and actuation operations of the brake with respect to the motor 10 are controlled by controlling the voltage applied to the braking unit 1. A DC power supply 4 for applying a DC voltage of, for example, 24 [V] is connected to the braking unit 1 via a switch 5. The switch 5 is used to control the application of the DC voltage to the braking unit 1. When the switch 5 is closed, the DC voltage of 24 [V] is applied to the braking unit 1, and when the switch 5 is opened, 0 [V] is applied to the braking unit 1. For example, when the DC voltage of 24 [V] is applied to the braking unit 1, the brake is released, and when no voltage is applied to the braking unit 1 (i.e., when 0 [V] is applied), the brake is actuated.

The motor 10 is provided with input terminals 8 and 9 for applying the voltage to the braking unit 1, and the DC voltage is applied between the terminals 8 and 9. In the present invention, the voltage detection unit 2 is provided in order to detect the voltage (terminal voltage) applied between the terminals 8 and 9. A spark killer 6 and a surge absorber 7 may be provided in parallel with the voltage detection unit 2.

The result of the detection of the terminal voltage applied to the braking unit 1 and detected by the voltage detection unit 2 is supplied to the observing unit 3. The observing unit 3 recognizes the voltage variation pattern based on the result of the detection of the terminal voltage applied to the braking unit 1. Then, based on the voltage variation pattern, the observing unit 3 observes the released and actuated states of the brake provided in the braking unit 1.

Figure 4:
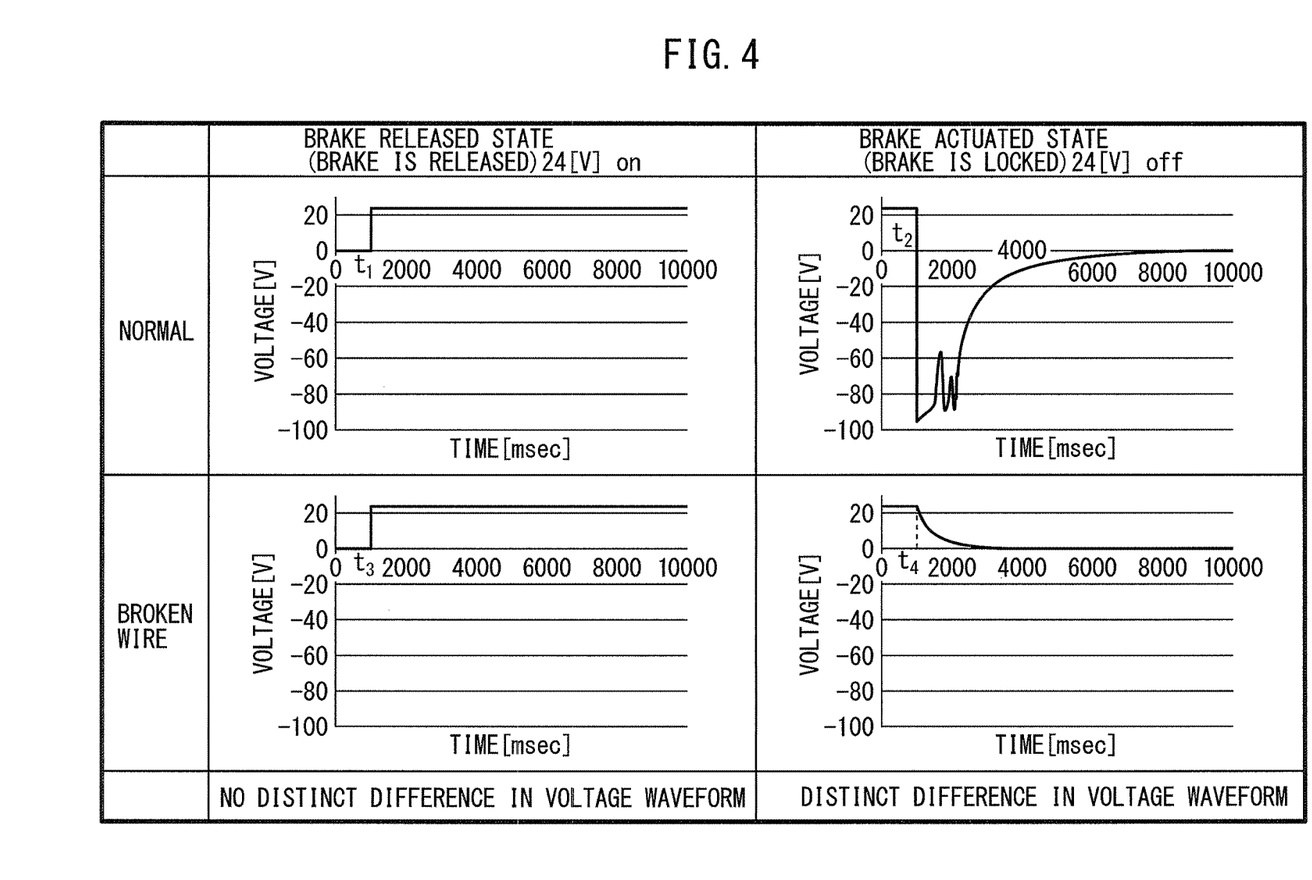
FIG. 4 is a diagram showing graphs depicting the variation with time of a voltage applied to a brake detected by the braking apparatus according to the first embodiment of the present invention when the voltage to the brake is turned on and off in normal operation for comparison with the case of a broken wire.

Next, a description will be given of how the actuated/released state of the brake is evaluated based on the voltage variation pattern detected by the voltage detection unit 2. FIG. 4 depicts the variation of the voltage applied to the brake with time (the voltage variation pattern) detected by the braking apparatus according to the first embodiment of the present invention when the voltage to the brake is turned on and off in normal operation for comparison with the case of a broken wire. As shown by the graph in the upper left of FIG. 4, it is assumed that the voltage of 24 [V] is applied between the terminals of the braking unit 1 at time $t_1$. When the voltage is applied between the terminals of the braking unit 1, the armature is attracted to the core, causing a gap between the armature and the friction plate, and the brake is thus released. In normal operation, the terminal voltage remains constant at 24 [V] after time $t_1$.

Next, as shown by the graph in the upper right of FIG. 4, when the application of the voltage between the terminals of the braking unit 1 is interrupted by opening the switch 5 at time $t_2$, the magnetic attraction force disappears, allowing the armature to be pressed against the friction plate by spring force, and thus the brake is put in a locked state (the brake is actuated). In normal operation, the voltage drops to about −95 [V] after time $t_2$, and thereafter gradually returns to 0 [V]. This is because, due to the self-induction effect of the brake coil, a back electromotive force is generated in a direction that does not cause the magnetic flux formed at the time of voltage application to disappear.

Next, a description will be given of the voltage variation pattern when there is a break in the wiring between the voltage detection unit 2 and the braking unit 1. As shown by the graph in the lower left of FIG. 4, it is assumed that the voltage of 24 [V] is applied between the terminals of the brake unit 1 at time $t_3$. In the illustrated example, there is a break in the wiring between the voltage detection unit 2 and the braking unit 1, but there is no break in the wiring between the DC power supply 4 and the voltage detection unit 2; therefore, the variation of the voltage with time is the same as that detected in normal operation.

On the other hand, as shown by the graph in the lower right of FIG. 4, the application of the voltage between the terminals of the braking unit 1 is interrupted by opening the switch 5 at time $t_4$. If, at this time, the voltage variation pattern gradually dropped to 0 [V] without rapidly dropping into the negative region after time $t_4$, the detected voltage variation pattern is distinctly different from that detected in normal operation; it can therefore be seen that there is a break in the wiring between the voltage detection unit 2 and the braking unit 1.

Figure 5:
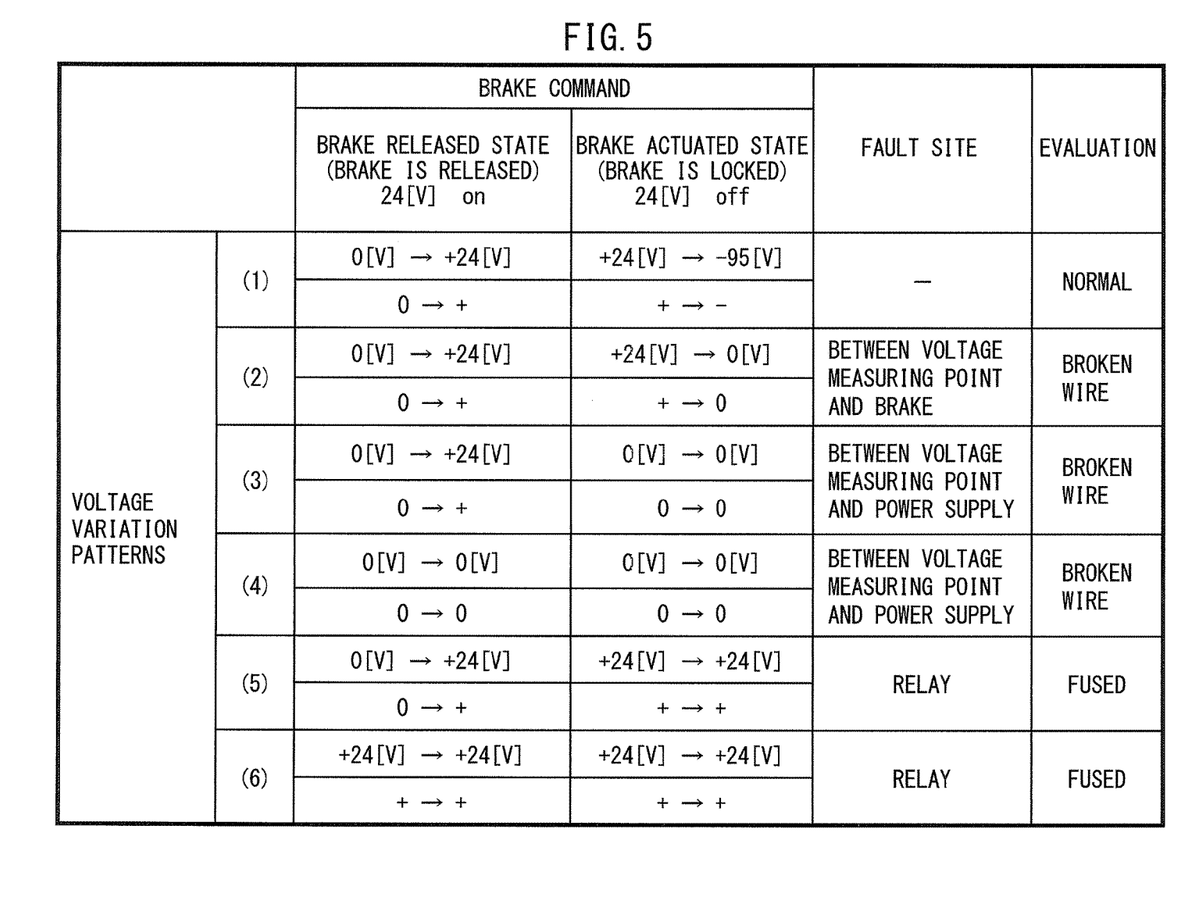
FIG. 5 is a table summarizing relationships associating voltage variation patterns detected by the braking apparatus according to the first embodiment of the present invention, with fault sites and the result of evaluation indicating the presence or absence of a fault.

In addition to the two voltage variation patterns described above, there are other voltage variation patterns, i.e., voltage variation patterns that can occur when there is a break in the wiring between the voltage detection unit 2 and the DC power supply 4, and voltage variation patterns that can occur when the switch (relay) 5 is fused. When a fault is detected in the brake release or actuation operation of the braking unit 1, the observing unit 3 can localize the fault site based on the voltage variation pattern. FIG. 5 shows the relationship between a total of six voltage variation patterns and corresponding fault sites.

The first voltage variation pattern (hereinafter called the "voltage variation pattern (1)") shows the case in which the braking apparatus is operating normally. This voltage variation pattern is as shown by the upper left and upper right graphs in FIG. 4. First, when the brake command is a release (brake release), the voltage of 24 [V] from the DC power supply 4 is applied to the braking unit 1 by closing the switch 5. Since the voltage detected by the voltage detection unit 2 varies from 0 [V] to 24 [V] at this time, this voltage variation will be represented by "0→+". On the other hand, when the brake command changes to an actuation (brake lock), the application of the voltage from the DC power supply 4 to the braking unit 1 is interrupted by opening the switch 5. Since the voltage detected by the voltage detection unit 2 varies from 24 [V] to −95 [V] at this time, this voltage variation will be represented by "+→−". The observing unit 3 stores the voltage variation pattern representing the normally operating state of the braking apparatus in a storage unit (not shown), and compares the detected voltage variation pattern with the stored voltage variation pattern to determine the presence or absence of a fault in the braking apparatus and to identify a fault site if any fault is detected.

The second voltage variation pattern (voltage variation pattern (2)) shows the case in which there is a break in the wiring between the voltage detection unit 2, i.e., the voltage measuring point, and the brake. This voltage variation pattern is as shown by the lower left and lower right graphs in FIG. 4. First, when the brake command is a release (brake release), the voltage of 24 [V] from the DC power supply 4 is applied to the braking unit 1 by closing the switch 5. Since the voltage detected by the voltage detection unit 2 varies from 0 [V] to 24 [V] at this time, this voltage variation will be represented by "0→+". On the other hand, when the brake command changes to an actuation (brake lock), the application of the voltage from the DC power supply 4 to the braking unit 1 is interrupted by opening the switch 5. Since the voltage detected by the voltage detection unit 2 varies from 24 [V] to 0 [V] at this time, this voltage variation will be represented by "+→0". When this voltage variation pattern is compared with the voltage variation pattern (1) representing the normally operating state, it is seen that the voltage variation is "+→0" even though it should normally be "+→−" when the brake command is a brake lock; therefore, it can be determined that there is a break in the wiring "between the voltage measuring point and the brake".

The third voltage variation pattern (voltage variation pattern (3)) shows the case in which there is no break in the wiring before the brake is released but there occurs a break in the wiring between the voltage detection unit 2, i.e., the voltage measuring point, and the power supply after the brake is released. First, when the brake command is a release (brake release), the voltage of 24 [V] from the DC power supply 4 is applied to the braking unit 1 by closing the switch 5. At this time, since there is no break in the wiring between the voltage detection unit 2 and the DC power supply 4, the voltage is applied to the braking unit 1, and the voltage detected by the voltage detection unit 2 varies to 24 [V]. This voltage variation will be represented by "0→+". After that, there occurs a break in the wiring between the voltage detection unit 2 and the power supply. When the brake command thereafter changes to an actuation (brake lock), the application of the voltage from the DC power supply 4 to the braking unit 1 is interrupted by opening the switch 5. Since, at this time, there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". When this voltage variation pattern is compared with the voltage variation pattern (1) representing the normally operating state, it is seen that the voltage variation is "0→0" even though it should normally be "+→−" when the brake command is a brake lock; therefore, it can be determined that there is a break in the wiring "between the voltage measuring point and the power supply".

The fourth voltage variation pattern (voltage variation pattern (4)) shows the case in which there is a break in the wiring between the voltage detection unit 2, i.e., the voltage measuring point, and the power supply. First, when the brake command is a release (brake release), the switch 5 is closed. In this case, since there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". On the other hand, when the brake command changes to an actuation (brake lock), the application of the voltage from the DC power supply 4 to the braking unit 1 is interrupted by opening the switch 5. At this time, since there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". When this voltage variation pattern is compared with the voltage variation pattern (1) representing the normally operating state, it is seen that the voltage variation is "0→0" even though it should normally be "0→+" when the brake command is a brake release; therefore, it can be determined that there is a break in the wiring "between the voltage measuring point and the power supply".

The fifth voltage variation pattern (voltage variation pattern (5)) shows the case in which there is no fusing before the brake is released but fusing occurs in the switch (relay) 5 after the brake is released. First, when the brake command is a release (brake release), the voltage of 24 [V] from the DC power supply 4 is applied to the braking unit 1 by closing the switch 5. At this time, since there is no fusing in the switch (relay) 5, the voltage of 24 [V] is applied to the braking unit 1, and the voltage detected by the voltage detection unit 2 varies to 24 [V]. This voltage variation will be represented by "0→+". After that, there occurs fusing in the switch. When the brake command thereafter changes to an actuation (brake lock), the application of the voltage from the DC power supply 4 to the braking unit 1 is interrupted by opening the switch 5. However, since fusing has already occurred in the switch (relay) 5 by this time, the voltage of 24 [V] continues to be applied to the braking unit 1, and the voltage detected by the voltage detection unit 2 remains at 24 [V]. This voltage variation will be represented by "+→+". When this voltage variation pattern is compared with the voltage variation pattern (1) representing the normally operating state, it is seen that the voltage variation is "+→+" even though it should normally be "+→−" when the brake command is a brake lock; therefore, it can be determined that the relay is fused.

The sixth voltage variation pattern (voltage variation pattern (6)) shows the case in which there is fusing in the switch (relay) 5. First, when the brake command is a release (brake release), the voltage of 24 [V] from the DC power supply 4 is applied to the braking unit 1 by closing the switch 5. Since the switch (relay) 5 is fused, the voltage of 24 [V] is being applied to the braking unit 1 all the time, and the voltage detected by the voltage detection unit 2 remains at 24 [V]. This voltage variation will be represented by "+→+". On the other hand, when the brake command changes to an actuation (brake lock), the application of the voltage from the DC power supply 4 to the braking unit 1 is interrupted by opening the switch 5. However, since the switch (relay) 5 is fused, the voltage of 24 [V] continues to be applied to the braking unit 1, and the voltage detected by the voltage detection unit 2 remains at 24 [V]. This voltage variation will be represented by "+→+". When this voltage variation pattern is compared with the voltage variation pattern (1) representing the normally operating state, it is seen that the voltage variation is "+→+" even though it should normally be "0→+" when the brake command is a brake release; therefore, it can be determined that the relay is fused.

As has been described above, according to the braking apparatus in the first embodiment of the present invention, when the detected voltage variation pattern corresponds to any one of the patterns (2) to (4), that is, when a break is detected at any point in the brake wiring, the motor can be prevented from being driven, thereby avoiding damage to the brake, motor, tool, workpiece, etc.

On the other hand, when the detected voltage variation pattern corresponds to the pattern (5) or (6), that is, when fusing is detected in the relay, the motor can be energized, thereby avoiding damage to the brake, motor, tool, workpiece, etc.

Second Embodiment

Figure 6:
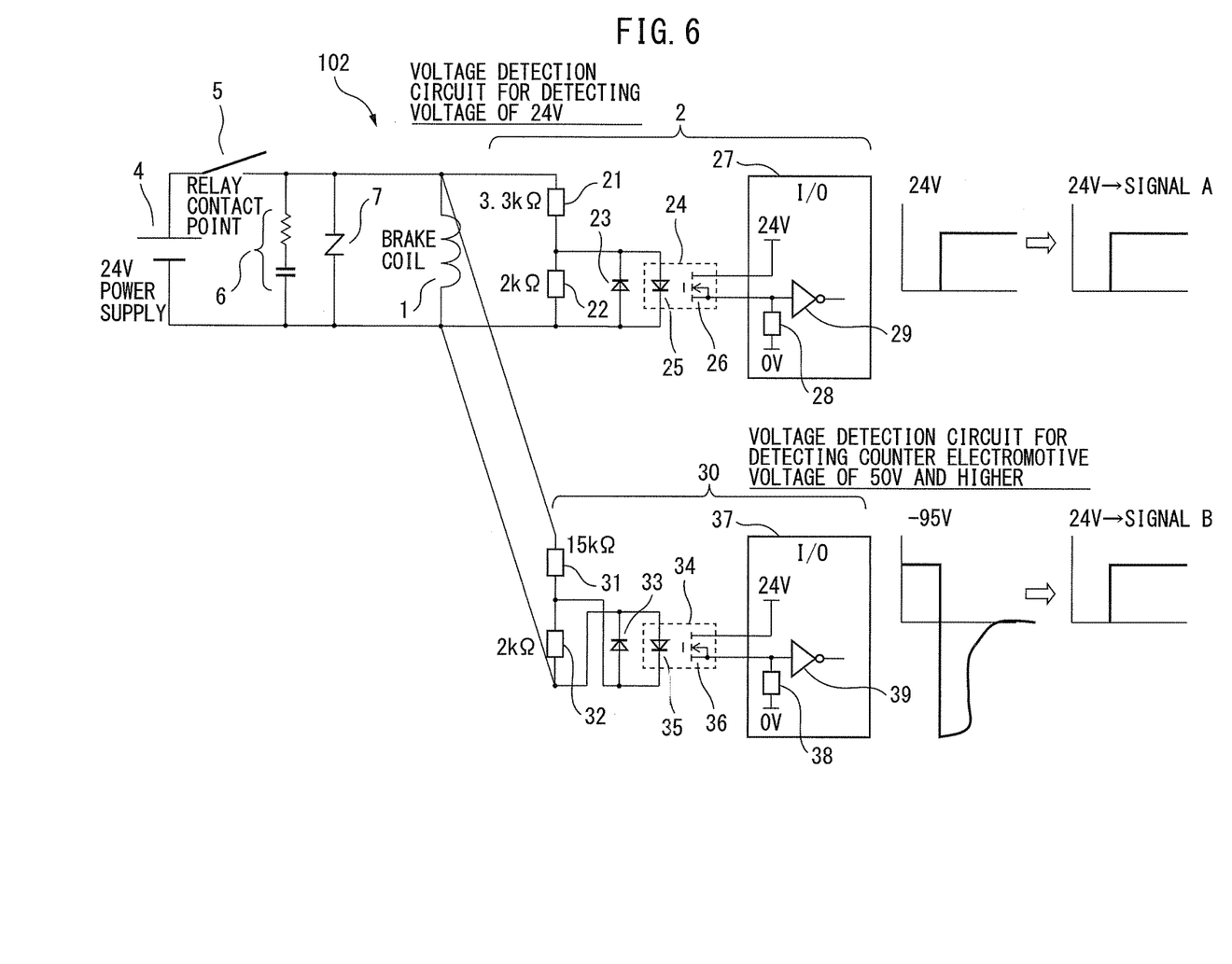
FIG. 6 is a diagram showing the configuration of a braking apparatus according to a second embodiment of the present invention.

A braking apparatus according to a second embodiment of the present invention will be described with reference to drawings. FIG. 6 is a diagram showing the configuration of the braking apparatus according to the second embodiment of the present invention. The braking apparatus 102 according to the second embodiment differs from the braking apparatus 101 according to the first embodiment in that the voltage detection unit 2 converts the voltage into a detectable signal. Otherwise, the braking apparatus 102 according to the second embodiment is identical in configuration to the braking apparatus 101 according to the first embodiment, and therefore, a detailed description of the configuration will not be repeated herein.

At the time of brake actuation, a surge voltage may occur, which can cause damage to the voltage detection unit 2. In view of this, the voltage detection unit 2 according to the second embodiment is configured to be able to detect the voltage safely.

The voltage detection unit 2 according to the second embodiment includes voltage dividing resistors 21 and 22, a diode 23, a photo MOS relay 24, and a voltage output unit 27. The photo MOS relay 24 includes an LED 25 and a MOS transistor 26. The voltage output unit 27 includes a resistor 28 and a NOT gate 29.

The voltage detection unit 2 shown in FIG. 6 converts the output voltage of 24 [V] into a signal A.

When the terminal voltage of the brake coil 1 is as large as −95 [V], a voltage detection unit 30 capable of detecting a counter electromotive voltage of 50 [V] and higher, such as shown in the lower part of FIG. 6, can be used. The voltage detection unit 30 according to the second embodiment includes voltage dividing resistors 31 and 32, a diode 33, a photo MOS relay 34, and a voltage output unit 37. The photo MOS relay 34 includes an LED 35 and a MOS transistor 36. The voltage output unit 37 includes a resistor 38 and a NOT gate 39.

The voltage detection unit 30 shown in FIG. 6 converts, for example, an output voltage of −95 [V] into a signal B.

Figure 7:
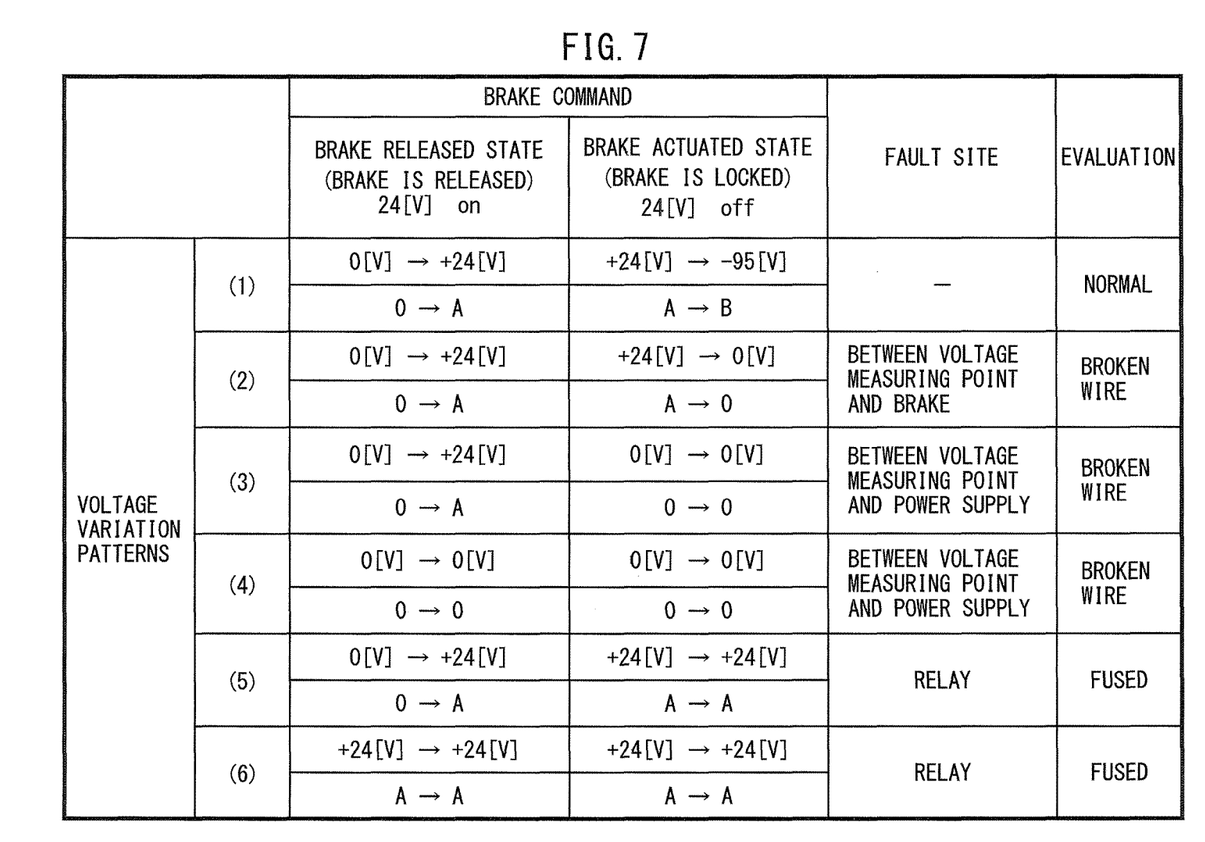
FIG. 7 is a table summarizing relationships associating voltage variation patterns detected by the braking apparatus according to the second embodiment of the present invention, with fault sites and the result of evaluation indicating the presence or absence of a fault.

A description will be given below of how the fault site can be localized based on the voltage variation pattern by using the braking apparatus of the second embodiment. FIG. 7 shows the relationship between six voltage variation patterns and corresponding fault sites.

The first voltage variation pattern (hereinafter called the "voltage variation pattern (1)") shows the case in which the braking apparatus is operating normally. First, when the brake command is a release (brake release), the voltage of 24 [V] from the DC power supply 4 is applied to the braking unit 1 by closing the switch 5. Since the voltage detected by the voltage detection unit 2 varies from 0 [V] to 24 [V] at this time, this voltage variation will be represented by "0→A". On the other hand, when the brake command changes to an actuation (brake lock), the application of the voltage from the DC power supply 4 to the braking unit 1 is interrupted by opening the switch 5. Since the voltage detected by the voltage detection unit 2 varies from 24 [V] to −95 [V] at this time, this voltage variation will be represented by "A→B". The observing unit 3 (see FIG. 3) stores the voltage variation pattern representing the normally operating state of the braking apparatus in a storage unit (not shown), and compares the detected voltage variation pattern with the stored voltage variation pattern to determine the presence or absence of a fault in the braking apparatus and to identify a fault site if any fault is detected.

The second voltage variation pattern (voltage variation pattern (2)) shows the case in which there is a break in the wiring between the voltage detection unit 2, i.e., the voltage measuring point, and the brake. First, when the brake command is a release (brake release), the voltage of 24 [V] from the DC power supply 4 is applied to the braking unit 1 by closing the switch 5. Since the voltage detected by the voltage detection unit 2 changes from 0 [V] to 24 [V] at this time, this voltage variation will be represented by "0→A". On the other hand, when the brake command changes to an actuation (brake lock), the application of the voltage from the DC power supply 4 to the braking unit 1 is interrupted by opening the switch 5. Since the voltage detected by the voltage detection unit 2 varies from 24 [V] to 0 [V] at this time, this voltage variation will be represented by "A→0". When this voltage variation pattern is compared with the voltage variation pattern (1) representing the normally operating state, it is seen that the voltage variation is "A→0" even though it should normally be "A→B" when the brake command is a brake lock; therefore, it can be determined that there is a break in the wiring "between the voltage measuring point and the brake".

The third voltage variation pattern (voltage variation pattern (3)) shows the case in which there is no break in the wiring before the brake is released but there occurs a break in the wiring between the voltage detection unit 2, i.e., the voltage measuring point, and the power supply after the brake is released. First, when the brake command is a release (brake release), the voltage of 24 [V] from the DC power supply 4 is applied to the braking unit 1 by closing the switch 5. At this time, since there is no break in the wiring between the voltage detection unit 2 and the DC power supply 4, the voltage is applied to the braking unit 1, and the voltage detected by the voltage detection unit 2 is 24 [V]. This voltage variation will be represented by "0→A". After that, there occurs a break in the wiring between the voltage detection unit 2 and the power supply. When the brake command thereafter changes to an actuation (brake lock), the application of the voltage from the DC power supply 4 to the braking unit 1 is interrupted by opening the switch 5. Since, at this time, there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". When this voltage variation pattern is compared with the voltage variation pattern (1) representing the normally operating state, it is seen that the voltage variation is "0→0" even though it should normally be "A→B" when the brake command is a brake lock; therefore, it can be determined that there is a break in the wiring "between the voltage measuring point and the power supply".

The fourth voltage variation pattern (voltage variation pattern (4)) shows the case in which there is a break in the wiring between the voltage detection unit 2, i.e., the voltage measuring point, and the power supply. First, when the brake command is a release (brake release), the switch 5 is closed. In this case, since there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". On the other hand, when the brake command changes to an actuation (brake lock), the application of the voltage from the DC power supply 4 to the braking unit 1 is interrupted by opening the switch 5. At this time, since there is a break in the wiring between the voltage detection unit 2 and the DC power supply 4, no voltage is applied to the braking unit 1, and the voltage detected by the voltage detection unit 2 remains at 0 [V]. This voltage variation will be represented by "0→0". When this voltage variation pattern is compared with the voltage variation pattern (1) representing the normally operating state, it is seen that the voltage variation is "0→0" even though it should normally be "0→A" when the brake command is a brake release; therefore, it can be determined that there is a break in the wiring "between the voltage measuring point and the power supply".

The fifth voltage variation pattern (voltage variation pattern (5)) shows the case in which there is no fusing before the brake is released but fusing occurs in the switch (relay) 5 after the brake is released. First, when the brake command is a release (brake release), the voltage of 24 [V] from the DC power supply 4 is applied to the braking unit 1 by closing the switch 5. At this time, since there is no fusing in the switch (relay) 5, the voltage of 24 [V] is applied to the braking unit 1, and the voltage detected by the voltage detection unit 2 is 24 [V]. This voltage variation will be represented by "0→A". After that, there occurs fusing in the switch. When the brake command thereafter changes to an actuation (brake lock), the application of the voltage from the DC power supply 4 to the braking unit 1 is interrupted by opening the switch 5. Since fusing has already occurred in the switch (relay) 5 by this time, the voltage of 24 [V] continues to be applied to the braking unit 1, and the voltage detected by the voltage detection unit 2 remains at 24 [V]. This voltage variation will be represented by "A→A". When this voltage variation pattern is compared with the voltage variation pattern (1) representing the normally operating state, it is seen that the voltage variation is "A→A" even though it should normally be "A→B" when the brake command is a brake lock; therefore, it can be determined that "the relay is fused".

The sixth voltage variation pattern (voltage variation pattern (6)) shows the case in which there is fusing in the switch (relay) 5. First, when the brake command is a release (brake release), the voltage of 24 [V] from the DC power supply 4 is applied to the braking unit 1 by closing the switch 5. Since the switch (relay) 5 is fused, the voltage of 24 [V] is being applied to the braking unit 1 all the time, and the voltage detected by the voltage detection unit 2 remains at 24 [V]. This voltage variation will be represented by "A→A". On the other hand, when the brake command changes to an actuation (brake lock), the application of the voltage from the DC power supply 4 to the braking unit 1 is interrupted by opening the switch 5. Since the switch (relay) 5 is fused, the voltage of 24 [V] continues to be applied to the braking unit 1, and the voltage detected by the voltage detection unit 2 remains at 24 [V]. This voltage variation will be represented by "A→A". When this voltage variation pattern is compared with the voltage variation pattern (1) representing the normally operating state, it is seen that the voltage variation is "A→A" even though it should normally be "0→A" when the brake command is a brake release; therefore, it can be determined that "the relay is fused".

While it has been described above that the voltage applied in order to release the brake is 24 [V] and that the back electromotive force is −95 [V], it will be recognized that these are only examples and need not be limited to any specific values.

As has been described above, according to the braking apparatus in the second embodiment of the present invention, the voltage can be detected safely without causing damage to the voltage detection unit due to a surge voltage that may occur at the time of brake actuation, and the brake released state can be identified from the voltage variation pattern detected when the voltage is applied to the braking unit.

According to the braking apparatus in the embodiments of the present invention, it becomes possible to detect the fault that the brake will not be released even when a voltage is applied to the braking apparatus and the fault that the brake remains released even when the voltage to the brake is turned off.

The invention claimed is:

1. A braking apparatus for use in an electrical motor, comprising:
   a braking unit for keeping position of the electrical motor;
   a voltage detection unit positioned between the braking unit and a power supply controlled by a power switch, the voltage detection unit for detecting a voltage applied to the braking unit by the power supply; and
   an observing unit for recognizing variation patterns of the voltage, and based on the variation patterns of the voltage, observing released and actuated states of the braking unit, by identifying:
      a broken wire between the voltage detection unit and the power supply based on a first pattern of the variation patterns in the detected voltage, the first pattern includes: 1) either a voltage increase or an unchanged voltage when the brake is released, or 2) an unchanged voltage when the brake is actuated,
      a broken wire between the voltage detection unit and the braking unit based on a second pattern of the variation patterns in the detected voltage, the second pattern includes either a voltage increase when the brake is released, or a voltage decrease when the brake is actuated, and
      a fused state of the power switch based on a third pattern of the variation patterns in the detected voltage, the third pattern includes: 1) either a voltage increase or an unchanged positive voltage when the brake is released, or 2) an unchanged positive voltage when the brake is actuated.

2. The braking apparatus according to claim 1, wherein a fault is detected in the releasing or actuation of the braking unit, the observing unit localizes a fault site based on the variation pattern of the voltage.

3. The braking apparatus according to claim 1, wherein the voltage detection unit converts the voltage into a detectable signal.

* * * * *